Jan. 8, 1952

L. PERRAULT 2,581,971

PIPE LINE CRADLE

Filed June 7, 1948

INVENTOR.
Lewis Perrault
BY
C. M. McKnight

Jan. 8, 1952

L. PERRAULT 2,581,971

PIPE LINE CRADLE

Filed June 7, 1948

INVENTOR.
Lewis Perrault
BY
C. M. McKnight

Patented Jan. 8, 1952

2,581,971

UNITED STATES PATENT OFFICE 2,581,971

PIPE LINE CRADLE

Lewis Perrault, Tulsa, Okla.

Application June 7, 1948, Serial No. 31,567

6 Claims. (Cl. 294—67)

This invention relates to a traction drive belt for pipe line cradles, which are normally used for suspending the pipe above the pipe line ditch. This invention is a continuation in part of applicant's co-pending application filed the 24th day of February, 1948 and entitled, "Drive Mechanism," under Serial No. 10,521 now abandoned.

In the present day pipe line construction and particularly where the pipe is cleaned, coated and wrapped prior to disposition in a pipe line ditch, it is necessary to suspend the pipe above the ditch in order to permit travel of the cleaning, coating and wrapping apparatus along the pipe. Pipe line cradles have been utilized for this purpose and the conventional cradles today are provided with steel crawler wheels engaging the under side of the pipe, while the cradle arms are held by a hoisting mechanism, such as the boom of a tractor, traveling alongside the pipe line. The reaction of forces between the cradle wheels and the weight of pipe line is such to cause the steel wheels to indent and flatten the pipe line along the underneath surface, thereby increasing the possibility of injury. This is particularly so in the present day use of large diameter thin wall pipe.

The present invention relates generally to an endless traction belt provided on a pipe line cradle in such a manner to permit movement of the cradle along the underneath side of the pipe without injury to the pipe.

It is an important object of this invention to provide a friction drive belt for use with pipe line cradles in order to effect a positive and non-slipping engagement of the cradle with the pipe line.

Another object of this invention is to provide an endless friction belt for a pipe line cradle of non-injurious flexible material having steel reinforcing wires in order to prevent elongation of the material during operation of the cradle along the line.

And still another object of this invention is to provide a flexible traction drive for pipe line cradles wherein the pipe engaging element of the cradle substantially conforms to the contour of the pipe.

Other objects and advantages of the invention will be evident from the following detailed description, read in conjunction with the accompanying drawings, which illustrate my invention.

Figure 3:
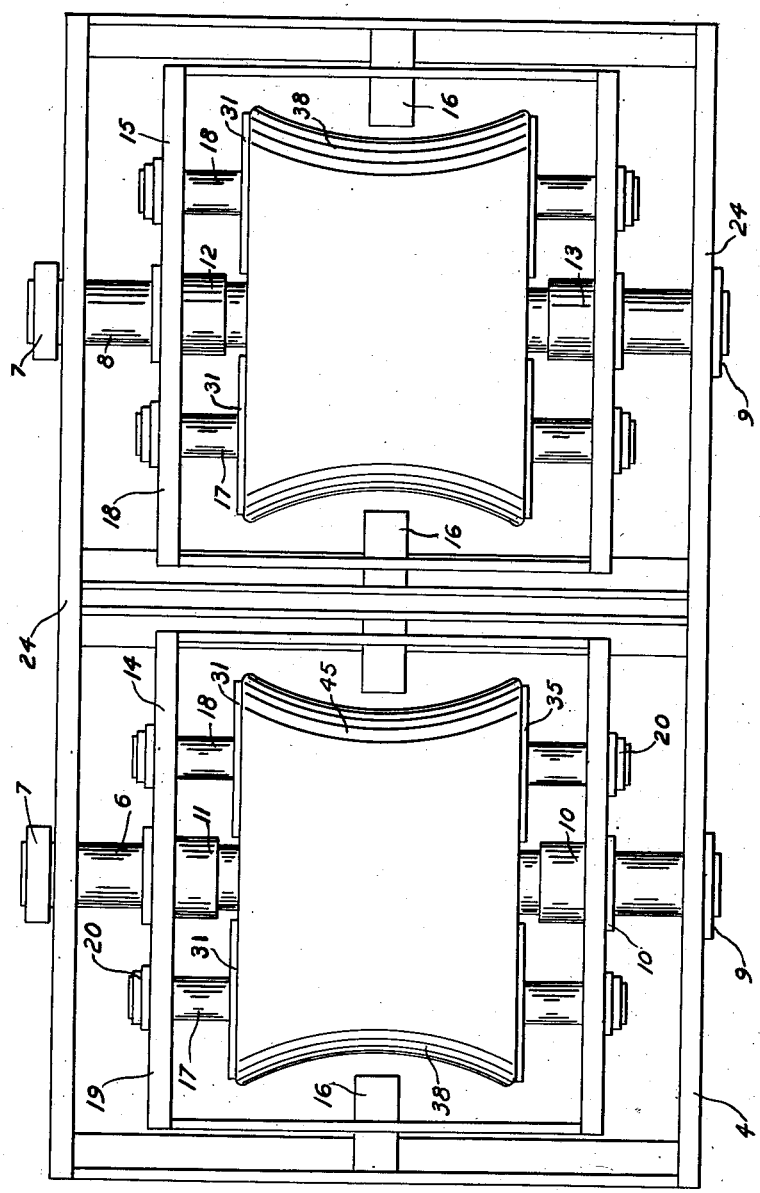
Figure 3 is a top plan view with certain elements omitted for clarity.

Referring to the drawings in detail reference character 2 indicates generally a pipe line cradle member comprising a frame 4 of substantially rectangular shape as is clearly shown in Figure 3. A pair of spaced shafts 6 and 8 are supported transversely in the side channels of the frame member 4 and held thereto by suitable collars 7 and 9. Loosely fitting bearing members 10, 11, 12 and 13 are provided on the shafts 6 and 8. The bearing members are integral with inner frame members 14 and 15. It will thus be apparent that the shaft 6 and 8, through the medium of the bearings, substantially supports the frames 14 and 15 within the frame 4. Due to the loose fit of the bearings, the frames 14 and 15 are permitted to slightly rock or pivot on the shafts 6 and 8. The outer frame 4 is further provided with inwardly extending brackets 16 cooperating with the frames 14 and 15 in order to additionally support the frames 14 and 15 within the outer frame 4. While Figure 3 shows a dual application of the drive belts for the cradle 2, it will be apparent that a single application could be utilized. For purposes of exemplification the duplicate elements of the drive belts in the pair of frames 14 and 15 will be numbered identically.

Figure 4:
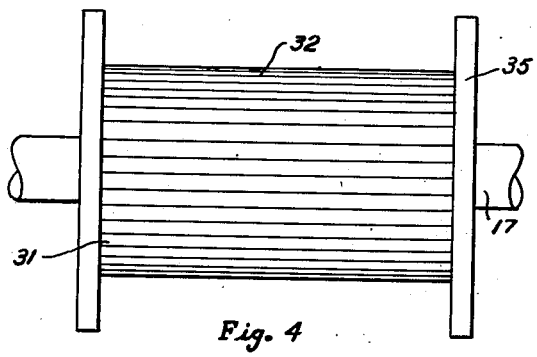
Figure 4 is an elevational view of the pulley for the traction belt.
Figure 5:
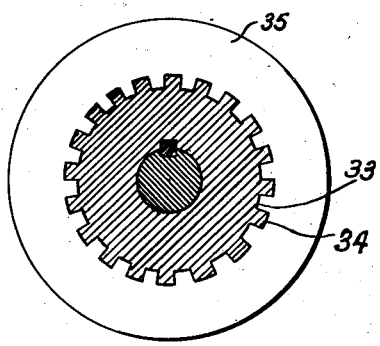
Figure 5 is a side elevational view of the drive pulley.

Each of the frames 14 and 15 are provided with a pair of transverse shafts 17 and 18 extending between the side channels 19 thereof. The shafts are fixed to the channels 19 by any suitable securing members 20. As clearly shown in Figure 1, the frame 4, at a point adjacent the large shafts 6 and 8, is provided with upstanding brackets 21 and 22 having apertures 23. The brackets are disposed on each side channel 24 of the frame 4, and the apertures 23 are adapted to receive ring members 25 integral with a pair of inwardly converging leg members 26 and 27, in turn secured through ring members 28 and 29 with a cable 30 of a tractor boom, or the like (not shown). As clearly shown in Figures 1 and 2, a pair of cables are provided on each side of the cradle 2 extending upwardly from the brackets 21 and 22. The shafts 17 and 18 in each frame 14 and 15 are each provided with a freely rotatable pulley member 31. The pulley member as shown in elevation in Figure 4 comprises a cylindrical body portion 32 having a plurality of transversely arranged alternate notches 33 and ribs 34 for a purpose as will be hereinafter set forth. The body portion 32 is provided with circular flanges 35 at opposite ends thereof, and extending outwardly from the body 32.

Figure 6:
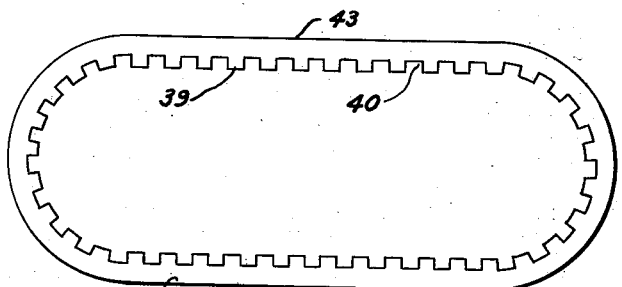
Figure 6 is a side elevational view of the inner drive belt.
Figure 8:
Figure 8 is a sectional view thereof.
Figure 7:
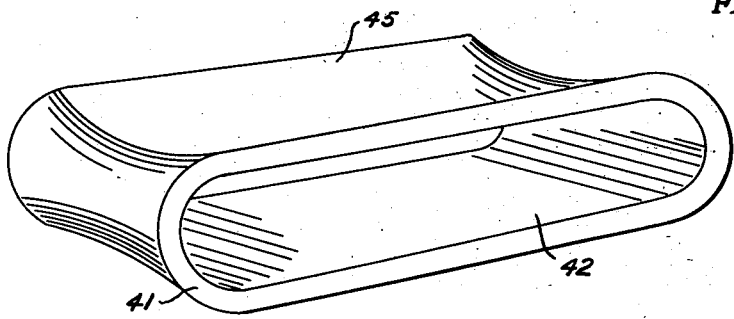
Figure 7 is a perspective view of the outer drive belt.

An endless drive belt 38, as clearly shown in Figures 6, 7 and 8, is provided on its inner periphery with a plurality of transversely arranged alternate ribs or teeth 39 and notches 40 adapted to cooperate with the notches and teeth respectively of a gear pulley 32. It will be apparent that each of the shafts 17 and 18 for each frame are provided with drive pulleys 32, and an endless drive belt 38 engages a pair of pulleys 32 in such a manner that the teeth 39 of the belt 38 will engage the notches 33 of the pulley, simultaneously with the teeth 34 of the pulley engaging the notches 40 of the inner drive belt 38. The drive belt is of a flexible material preferably a molded rubber and characterized by a high frictional efficiency. As clearly shown in Figure 7, an outer tread belt 41 is adapted to cooperate with the inner belt 38. The belt 41 is of the endless type preferably of molded rubber similar to the belt 38 and is adapted to engage the outer surface of the inner drive belt 38. The inner periphery 42 of the belt 41 is a smooth surface, but frictionally engages the outer surface 43 of the belt 38. The frictional engagement between the belt surfaces will cause movement of the belt 41 simultaneous with the belt 38. The outer face of the drive belt 41 is formed with a concave surface or groove 45, as clearly shown in Figures 7 and 8. Furthermore, both belts 38 and 41 are preferably reinforced with steel wires 44 embedded in the molded rubber in order to preclude any elongation or stretching of the belts, thereby eliminating adjustment of the belts on the pulleys 32. It will be apparent that the molded rubber provides a flexible, slipless and noiseless drive belt. The flexible belts 38 and 41 are prevented from transverse movement on the gear pulleys 32 by the circular flanges 35 at the opposite sides of the pulleys 32.

Operation

Figure 1:
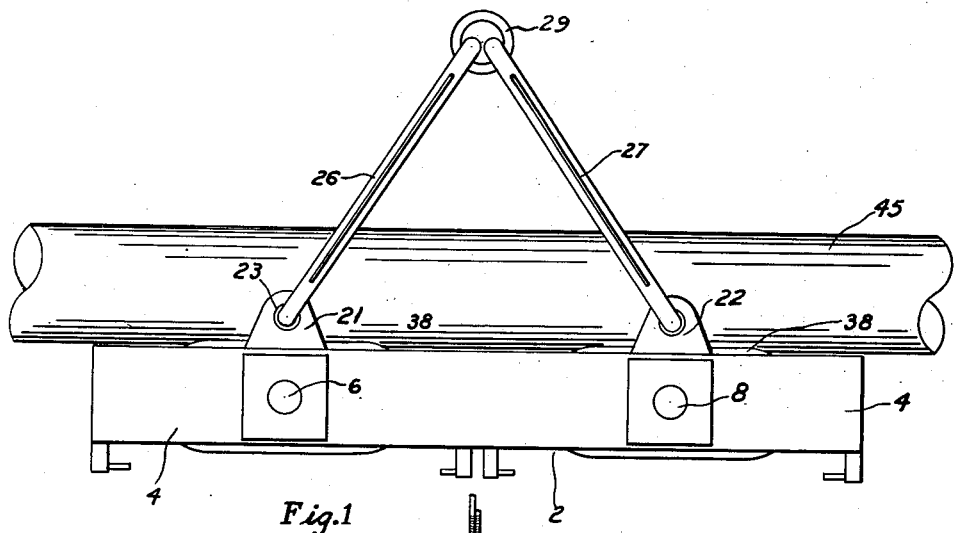
Figure 1 is a side elevation of the invention shown with a pipe line.
Figure 2:
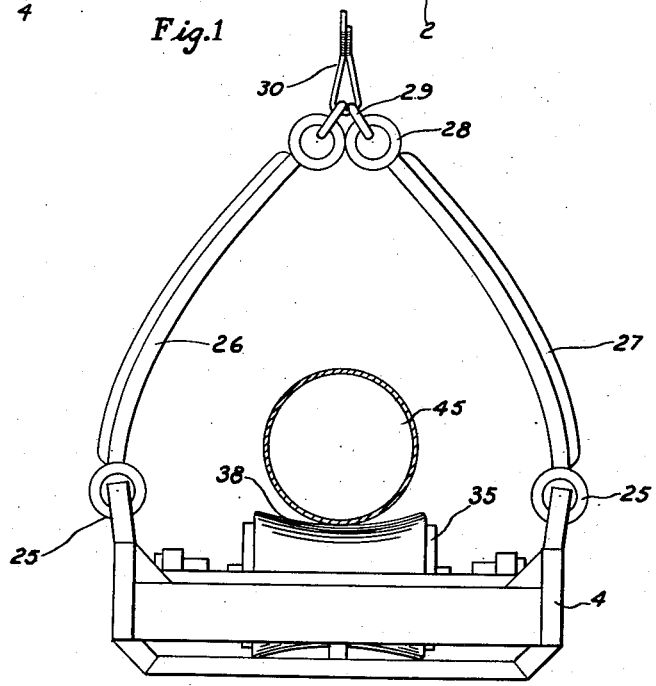
Figure 2 is a front or end elevation thereof.

The cradle member 2 in assembled relation with the drive belts 38, as shown in Figures 1 to 3, inclusive, is disposed on the underneath side of a pipe 45, and the tong or leg members 26 and 27 of the cradle are connected with a cable 30 of a tractor boom (not shown). It will be apparent that the tractor boom through the cradle member lifts the pipe above the ditch or the ground, and maintains it in suspended relation for the purpose of permitting the various cleaning, coating and wrapping apparatus to travel longitudinally therealong. The drive belts 38 and tread belts 41 permit travel of the cradle member simultaneously with the tractor (not shown) along the suspended pipe. The concave groove 45 of the belt 41 conforms to the outer periphery or contour of the pipe to assist in maintaining the frictional engagement of the belts with the pipe to provide the non-slipping drive connection for the cradle member 2. It will be apparent as the tractor moves along the drive and tread belts are rotated on the pulley gears 32 to permit the cradle member 2 and the supporting frame members 4, 14 and 15 to simultaneously travel along the pipe.

It will be apparent that the cradle mechanism is not limited to any particular number of drive belts, and one or more may be utilized, as desired. Furthermore, the loose fit of the bearings for the inner frames 14 and 15 relative to the shaft 6 permits a pivoting or rocking action of the frames, as well as the pulleys 31, thereby assisting the concave groove 45 of the outer tread belts to provide a better frictional engagement with the under surface of the pipe. This is particularly advantageous due to any slight inclination of the pipe with the horizontal. The apparatus is not limited to the use of two drive belts, such as the sectional belts shown, but may utilize a unitary belt, such as shown in Figure 6 wherein the outer surface thereof will have direct engagement with the pipe. The outer tread belt 41 is preferably utilized to permit replacement thereof due to wear and tear without necessarily replacing the inner drive belt 38, which obviously will not wear as rapidly as the pipe engaging tread belt 41.

From the foregoing it will be apparent that the present invention provides a drive mechanism for pipe line cradles effecting a positive and efficient movement of the cradle without any of the detriments normally prevailing due to engagement of steel crawler wheels with the pipe. Particularly the flexible rubber traction belts provide a positive non-slipping drive for moving the cradle along the underneath surface of the pipe without any digging in or distortion of the pipe surface. Such distortion or indentation would have a tendency to weaken the pipe under extreme high pressures, thus giving rise to the possibility of rupture. The endless traction belts conform to the contour of the pipe in order to provide a more positive and efficient traction therewith. Furthermore, the belts are reinforced with any suitable reniforced element, such as steel wires, or the like, to prevent stretching or elongation of the belt during its movement around the drive pulleys to assist in maintaining a positive drive for the cradle along the underneath side of the pipe.

Changes may be made in the specification and drawings without departing from the spirit of the invention within the scope of the following claims, as set forth.

What I claim is:

1. In a cradle apparatus utilized for the suspension of pipe lines and adapted to be propelled therealong, and comprising an outer frame, a shaft carried by the frame, an inner frame pivotably supported on the shaft, a pair of rotatable pulleys carried by the inner frame, a flexible endless drive belt interconnecting the pulleys, said belt having a groove substantially conforming to the contour of the pipe for engagement with the underneath surface thereof to facilitate movement of the cradle longitudinally along the pipe.

2. In a cradle apparatus utilized for the suspension of pipe lines and adapted to be propelled therealong, and comprising an outer frame, a shaft carried by the frame, an inner frame pivotably supported on the shaft, a pair of spaced rotatable shafts carried by the inner frame, a pulley carried by the shafts, a resilient endless drive belt interconnecting the pulleys and adapted to engage the underneath surface of the pipe, means providing a positive engagement between the drive belt and the pulleys to permit movement of the cradle longitudinally along the shaft.

3. In a cradle apparatus utilized for the suspension of pipe lines and adapted to be propelled therealong comprising an outer frame, a plurality of shafts carried by the frame, an inner frame member supported on each of the shafts, a pair of rotatable shafts carried by the inner frame members, flanged pulleys carried by the rotatable shafts, a rubber drive belt interconnecting the pulleys and adapted to engage the underneath surface of the pipe to assist movement of the cradle longitudinally therealong without any distortion to the pipe surface.

4. In a cradle apparatus utilized for the suspension of pipe lines and adapted to be propelled therealong comprising an outer frame, a plurality of fixed shafts carried by the frame, an inner frame member pivotably supported on each of the shafts, rotatable pulleys carried by the inner frame members, a resilient endless drive belt interconnecting the pulleys and adapted to engage the underneath surface of the pipe to cause movement of the cradle longitudinally therealong.

5. In a cradle apparatus utilized in pipe lines and adapted to travel therealong comprising a frame, a pair of rotatable flanged pulleys carried by the frame, a resilient drive belt interconnecting between the pulleys, means providing a positive engagement between the pulleys of the endless belt, a tread belt disposed on the drive belt and engaging the pipe, said drive belt and tread belt permitting travel of the cradle along the pipe without any injury or distortion thereto.

6. In a pipe line cradle device utilized for suspension of pipe lines and adapted to travel longitudinally therealong and comprising a frame, a pair of rotatable pulley gears carried by the frame, an endless resilient drive belt interconnecting the pulleys, means providing a substantially positive engagement between the belt and the pulleys, a tread belt disposed on the drive belt and adapted to engage the underneath surface of the pipe, an arcuate groove in the tread belt conforming to the contour of the pipe to assist the frictional engagement of the cradle with the pipe.

LEWIS PERRAULT.

REFERENCES CITED

The following references are of record in the file of this patent:

UNITED STATES PATENTS

| Number | Name | Date |
|---|---|---|
| 405,994 | Espenschied | June 25, 1889 |
| 1,866,381 | Ward | July 5, 1932 |
| 2,077,188 | Rishel | April 13, 1937 |
| 2,228,034 | Nelles | Jan. 7, 1941 |